United States Patent
Park

(10) Patent No.: US 11,823,418 B2
(45) Date of Patent: Nov. 21, 2023

(54) METHOD AND SYSTEM FOR IMPROVING COMPRESSION RATIO BY DIFFERENCE BETWEEN BLOCKS OF IMAGE FILE

(71) Applicant: Snow Corporation, Seongnam-si (KR)

(72) Inventor: Byung-Sun Park, Seongnam-si (KR)

(73) Assignee: SNOW CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/697,194

(22) Filed: Mar. 17, 2022

(65) Prior Publication Data

US 2022/0207779 A1 Jun. 30, 2022

Related U.S. Application Data

(63) Continuation of application No. 16/775,906, filed on Jan. 29, 2020, now Pat. No. 11,308,647.

(30) Foreign Application Priority Data

Jan. 30, 2019 (KR) .......... 10-2019-0011765

(51) Int. Cl.
*G06T 7/00* (2017.01)
*G06T 9/00* (2006.01)
*G06T 7/11* (2017.01)

(52) U.S. Cl.
CPC ........... *G06T 9/00* (2013.01); *G06T 7/11* (2017.01); *G06T 2207/20021* (2013.01)

(58) Field of Classification Search
CPC .. H04N 19/182; H04N 19/176; H04N 19/132; H04N 19/186; H04N 9/8042; G06T 2207/20021; G06T 9/00
See application file for complete search history.

(56) References Cited

U.S. PATENT DOCUMENTS

| | | | |
|---|---|---|---|
| 5,245,441 A | 9/1993 | Ruben | |
| 5,659,631 A | 8/1997 | Gormish et al. | |
| 6,026,217 A | 2/2000 | Adiletta | |
| 6,101,276 A | 8/2000 | Adiletta et al. | |
| 6,292,589 B1 | 9/2001 | Chow et al. | |
| 6,311,258 B1 | 10/2001 | Gibson et al. | |
| 6,407,741 B1 | 6/2002 | Morein et al. | |

(Continued)

FOREIGN PATENT DOCUMENTS

| | | |
|---|---|---|
| CN | 102640184 A | 8/2012 |
| JP | H08-009369 A | 1/1996 |

(Continued)

OTHER PUBLICATIONS

Office Action for Korean Patent Application No. 10-2019-0011765 dated Jan. 17, 2020.

(Continued)

*Primary Examiner* — Li Liu
(74) *Attorney, Agent, or Firm* — Harness, Dickey & Pierce P.L.C.

(57) ABSTRACT

An image compression method includes segmenting, by a processor, an image file to be compressed into a plurality of blocks; performing, by the processor, a first pixel conversion based on pixel difference values between blocks from among the plurality of blocks; and storing the image file of which the first pixel conversion is completed in a first format.

20 Claims, 10 Drawing Sheets

(56) References Cited

U.S. PATENT DOCUMENTS

| | | |
|---|---|---|
| 6,573,846 B1 | 6/2003 | Trivedi et al. |
| 6,792,153 B1 | 9/2004 | Tsujii |
| 7,039,241 B1 | 5/2006 | Van Hook |
| 9,367,892 B2 | 6/2016 | Wu et al. |
| 9,521,416 B1 | 12/2016 | McMahon et al. |
| 10,939,138 B1 | 3/2021 | Persiantsev |
| 11,323,718 B2 * | 5/2022 | Martinelli ............ H04N 19/176 |
| 2001/0027392 A1 | 10/2001 | Wiese |
| 2003/0081846 A1 | 5/2003 | Whitehead |
| 2004/0022312 A1 | 2/2004 | Jones et al. |
| 2004/0135903 A1 | 7/2004 | Brooks et al. |
| 2005/0066083 A1 | 3/2005 | Chan et al. |
| 2006/0028686 A1 | 2/2006 | Bergman et al. |
| 2006/0067582 A1 | 3/2006 | Bi et al. |
| 2006/0159358 A1 | 7/2006 | Yi |
| 2007/0041633 A1 | 2/2007 | Bhaskaran et al. |
| 2008/0001975 A1 | 1/2008 | Obara |
| 2008/0031598 A1 | 2/2008 | Ohara et al. |
| 2008/0131087 A1 | 6/2008 | Lee et al. |
| 2008/0152235 A1 | 6/2008 | Bashyam et al. |
| 2013/0093944 A1 | 4/2013 | Fukami |
| 2014/0185687 A1 | 7/2014 | Endresen |
| 2015/0277776 A1 * | 10/2015 | Okamoto ............ H04N 19/182 382/244 |
| 2016/0330470 A1 | 11/2016 | Jang et al. |
| 2018/0182127 A1 | 6/2018 | Kol et al. |

FOREIGN PATENT DOCUMENTS

| | | |
|---|---|---|
| JP | 2000-068855 A | 3/2000 |
| JP | 2000-244922 A | 9/2000 |
| JP | 2002-369010 A | 12/2002 |
| JP | 2006-502673 A | 1/2006 |
| JP | 2008-060876 A | 3/2008 |
| JP | 2013-507084 A | 2/2013 |
| JP | 2015-115721 A | 6/2015 |
| JP | 2016-208356 A | 12/2016 |
| JP | 2017-005456 A | 1/2017 |
| JP | 2018-527773 A | 9/2018 |
| KR | 10-0385865 B1 | 6/2003 |
| KR | 10-2010-0013142 A | 2/2010 |
| WO | WO-2004/068844 A1 | 8/2004 |
| WO | WO-2005046199 A2 | 5/2005 |

OTHER PUBLICATIONS

Office Action dated Jan. 12, 2021 issued in corresponding Japanese Patent Application No. 2020-012562.

Office Action dated Nov. 16, 2021 in Chinese Application No. 202010069831.X.

Office Action for Corresponding Korean Patent Application No. 10-2019-0011764 dated Jan. 2, 2020.

Office Action dated Feb. 9, 2021 issued in corresponding Japanese Patent Application No. 2020-012563.

Notice of Allowance dated Sep. 9, 2022 for corresponding U.S. Appl. No. 16/775,616.

* cited by examiner

100

| R | G | B |
|---|---|---|
| 30 | 32 | 35 |
| 29 | 31 | 34 |

Pixel conversion

| R | G | B |
|---|---|---|
| 28 | 32 | 32 |
| 28 | 28 | 32 |

FIG.7
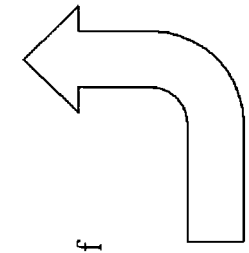
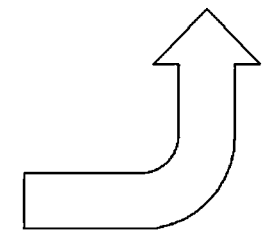

900

METHOD AND SYSTEM FOR IMPROVING COMPRESSION RATIO BY DIFFERENCE BETWEEN BLOCKS OF IMAGE FILE

CROSS-REFERENCE TO RELATED APPLICATIONS

This U.S. non-provisional application is a continuation of U.S. patent application Ser. No. 16/775,906, filed on Jan. 29, 2020, which claims the benefit of priority under 35 U.S.C. § 119 to Korean Patent Application No. 10-2019-0011765, filed Jan. 30, 2019, in the Korean Intellectual Property Office (KIPO), the entire contents of each of which are incorporated herein by reference in their entirety.

TECHNICAL FIELD

One or more example embodiments relate to a method, system, apparatus, and/or non-transitory computer readable medium for compressing an image file.

RELATED ART

In general, an image uses information about each of pixels included in the image. Therefore, a photographic image or a graphic image similar thereto is regarded as a large capacity file.

Such a photographic image or a graphic image similar thereto uses a storage space of 1 megabyte (Mbyte) or more and also uses a significant amount of transmission time in the case of using a communication network of a low transmission rate.

In the recent years, techniques for compressing an image to reduce an amount of storage space used to store an image and to reduce a transmission time are being developed.

An image compression method is classified into a loss compression method and a lossless compression method. Such a compression method may compress an image by removing spatial, temporal, and probabilistic redundancies.

As an example of an image compression technique, an image compression technique used for a universal serial bus (USB) camera through access to an USB interface of a personal computer (PC) is disclosed in Korean Registered Patent Publication No. 10-0385865 (registered on May 19, 2003).

SUMMARY

At least some example embodiments provide a method and system for compressing an image file through a pixel conversion of masking a portion of bits of each pixel of the image file.

At least some example embodiments also provide a method and system for compressing an image file through a pixel conversion using a pixel difference value between blocks of the image file.

According to at least some example embodiments, an image compression method includes segmenting, by a processor, an image file to be compressed into a plurality of blocks; performing, by the processor, a first pixel conversion based on pixel difference values between blocks from among the plurality of blocks; and storing the image file of which the first pixel conversion is completed in a first format.

The segmenting may include grouping pixels of the image file based on a block unit of a same size and segmenting the image file into the plurality of blocks.

The performing of the first pixel conversion may include calculating differences between pixel values of pixels of a first block and corresponding pixel values of pixels of a second block; and replacing the pixel values of the second block with the calculated differences.

The first block may be a reference block from among the plurality of blocks, and the second block may be neighboring block of the reference block or another block from among the plurality of blocks.

The image compression method may further include performing, by the processor, a second pixel conversion by masking a portion of bits of a byte representing each pixel value.

The performing of the second pixel conversion may include masking a first number of bits to zeros based on one or more least significant bits of the byte representing each pixel value.

The storing may include separately generating and storing a code of each of red, green, and blue (RGB) color channels for each block of the image file, after the first pixel conversion is completed.

The storing may include separately generating and storing a code of each of red, green, and blue (RGB) color channels with respect to the plurality of blocks of the image file, after the first pixel conversion is completed.

The storing may include generating and storing a code of all of red, green, and blue (RGB) color channels for each block of the image file, after the first pixel conversion is completed.

The storing may include generating and storing a code of all of red, green, and blue (RGB) color channels with respect to the plurality of blocks of the image file, after the first pixel conversion is completed.

The storing may include grouping and processing a file generated based on a pixel difference value between the plurality of blocks according to a preset compression method in the case of storing the image file of which the pixel conversion is completed.

According to at least some example embodiments, a non-transitory computer-readable recording medium stores instructions that, when executed by a processor, cause the processor to perform operations including, segmenting, by a processor, an image file to be compressed into a plurality of blocks, performing, by the processor, a first pixel conversion based on pixel difference values between blocks from among the plurality of blocks, and storing the image file for which the first pixel conversion is completed in a first format.

According to at least some example embodiments, a computer system includes memory storing computer-executable instructions; and one or more processors configured to execute the computer-executable instructions such that the one or more processors are configured to, segment an image file to be compressed into a plurality of blocks, perform a first pixel conversion based on pixel difference values between blocks from among the plurality of blocks, and store the image file of which the first pixel conversion is completed in a first format.

The one or more processors may be configured to execute the computer-executable instructions such that the one or more processors are further configured to group pixels of the image file based on a block unit of a same size and to segment the image file into the plurality of blocks.

The computer system of claim 13, wherein the one or more processors may be configured to execute the computer-executable instructions such that the one or more processors are further configured to calculate differences between pixel values of pixels of a first block and corresponding pixel values of pixels of a second block, and replace the pixel values of the second block with the calculated differences.

The one or more processors may be configured to execute the computer-executable instructions such that the one or more processors are further configured such that the first block is a reference block from among the plurality of blocks, and the second block is neighboring block of the reference block or another block from among the plurality of blocks.

The one or more processors may be configured to execute the computer-executable instructions such that the one or more processors are further configured to adjust a corresponding pixel value by masking a portion of bits of a byte representing each pixel value.

The one or more processors may be configured to execute the computer-executable instructions such that the one or more processors are further configured to mask a first number of bits to zeros based one or more least significant bits of the byte representing each pixel value.

The one or more processors may be configured to execute the computer-executable instructions such that the one or more processors are further configured to separately generate a code of each of red, green, blue (RGB) color channels or generate a code of all of the RGB color channels and thereby store the same for each block of the image file of which the first pixel conversion is completed, or to separately generate a code of each of RGB color channels or generate a code of all of the RGB color channels and thereby store the same for the plurality of blocks of the image file of which the pixel conversion is completed.

The one or more processors may be configured to execute the computer-executable instructions such that the one or more processors are further configured to group and process a file generated based on a pixel difference value between the plurality of blocks according to a preset compression method in the case of storing the image file of which the pixel conversion is completed.

BRIEF DESCRIPTION OF DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIGS. 7 and 8 illustrate examples of a process of calculating a pixel difference value between blocks according to at least some example embodiments.

DETAILED DESCRIPTION

Figure 1:
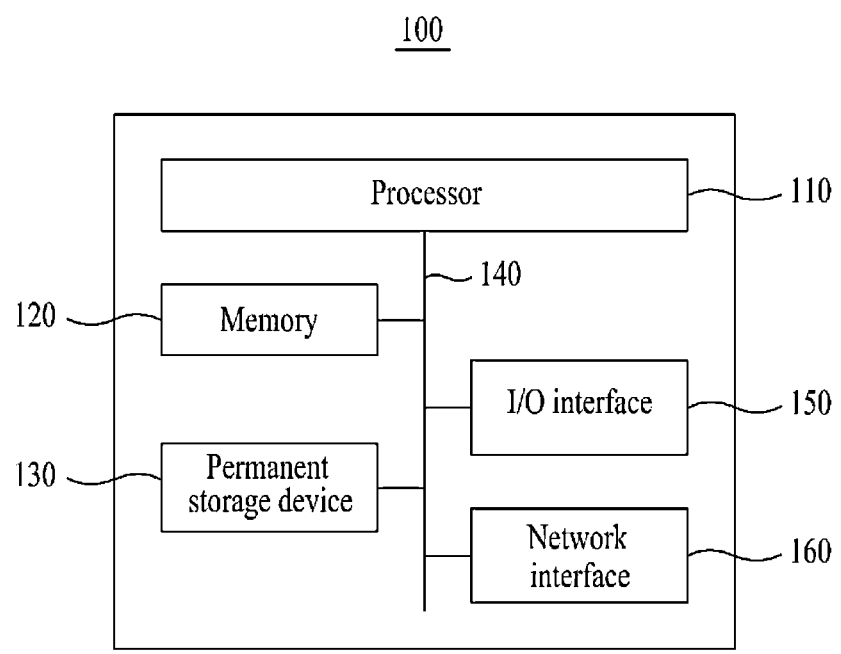
FIG. 1 is a diagram illustrating an example of a configuration of a computer system according to at least some example embodiments.

Detailed example embodiments are disclosed herein. However, specific structural and functional details disclosed herein are merely representative for purposes of describing example embodiments of the inventive concepts. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Hereinafter, example embodiments will be described with reference to the accompanying drawings.

At least some example embodiments relate to technology for compressing an image file.

At least some example embodiments including disclosures herein may provide an image compression technique through a pixel conversion of an image file and accordingly, may achieve many advantages in terms of improving an image compression ratio, guaranteeing the quality of an image, and saving a storage space and cost.

FIG. 1 is a diagram illustrating an example of a configuration of a computer system according to at least some example embodiments. For example, an image compression system according to example embodiments may be configured through a computer system 100 of FIG. 1. Referring to FIG. 1, the computer system 100 may include a processor 110, a memory 120, a permanent storage device 130, a bus 140, an input/output (I/O) interface 150, and a network interface 160 as components to implement the image compression method.

The processor 110 may include any device capable of processing a sequence of instructions as a component for an image compression or may be a portion thereof. For example, the processor 110 may include a computer processor, a processor in a mobile device or another electronic device and/or a digital processor. The processor 110 may be included in, for example, a server computing device, a server computer, a series of server computers, a server farm, a cloud computer, and a content platform. The processor 110 may access the memory 120 through the bus 140.

The processor 110 may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The memory 120 may include a volatile memory, a permanent memory, a virtual memory, or other types of memory to store information used by the computer system 100 or information output from the computer 100. The memory 120 may include, for example, random access memory (RAM) and/or dynamic RAM (DRAM). The memory 120 may be used to store information, such as state information of the computer system 100. The memory 120 may be used to store instructions of the computer system 100 that includes instructions for an image compression. If necessary or if appropriate, the computer system 100 may include at least one processor 110. According to at least some example embodiments that memory 120 may store computer-executable code including instructions for causing the processor 110 to carry out and/or control some or all of the operations described in the present disclosure as being performed by the processor 110, the computer system 100 or an element thereof.

The bus 140 may include a communication based structure that enables an interaction between various components of the computer system 100. For example, the bus 140 may convey data between components of the computer system 100, for example, between the processor 110 and the memory 120. The bus 140 may include wireless and/or wired communication media between components of the computer system 100 and may include parallel, serial, or other topology arrangements.

The permanent storage device 130 may include components, such as a memory used by the computer system 100 or another permanent storage device to store data during an extended duration, for example, compared to the memory 120. The permanent storage device 130 may include a nonvolatile main memory used by the processor 110 in the computer system 100. The permanent storage device 130 may include, for example, a flash memory, a hard disc, an optical disc, or other computer readable media.

The I/O interface 150 may include interfaces for a keyboard, a mouse, a voice command input, a display, or other input or output devices. Configuration instructions and/or input for an image compression may be received through the I/O interface 150.

The network interface 160 may include at least one interface about networks such as a local area network (LAN) or the Internet. The network interface 160 may include interfaces for wired or wireless connections. Configuration instructions and/or input for an image compression may be received through the network interface 160.

According to other example embodiments, the computer system 100 may include a smaller or greater number of components than the number of components shown in FIG. 1. For example, the computer system 100 may include at least a portion of I/O devices connected to the I/O interface 150, or may further include other components, for example, a transceiver, a global positioning system (GPS) module, a camera, a variety of sensors, and a database.

At least some example embodiments relate to technology for compressing an image file, and employ image compression technology for portable network graphics (PNG) or joint photographic experts group (JPG), and the like.

Figure 2:
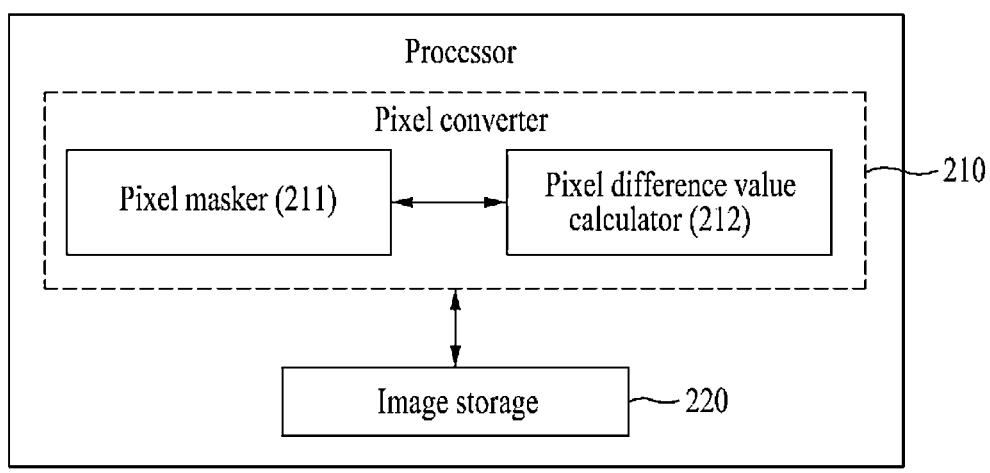
FIG. 2 is a diagram illustrating an example of components includable in a processor of a computer system according to at least some example embodiments.

FIG. 2 is a diagram illustrating an example of components includable in a processor of a computer system according to at least some example embodiments.

Referring to FIG. 2, the processor 110 may include a pixel converter 210 and an image storage 220. Depending on example embodiments, the pixel converter 210 may include at least one of a pixel masker 211 and a pixel difference value calculator 212.

Such components of the processor 110 may be representations of different functions performed by the processor 110 in response to a control instruction provided from at least one program code. For example, the pixel converter 210 may be used as a functional representation for the processor 110 to control the computer system 100 to convert each pixel value of the image file. The processor 110 and the components of the processor 110 may perform operations included in the following image compression method. For example, the processor 110 and the components of the processor 110 may be configured to execute an instruction according to the at least one program code and a code of an OS included in the memory 120. Here, the at least one program code may correspond to a code of a program configured to process the image compression method.

Figure 3:
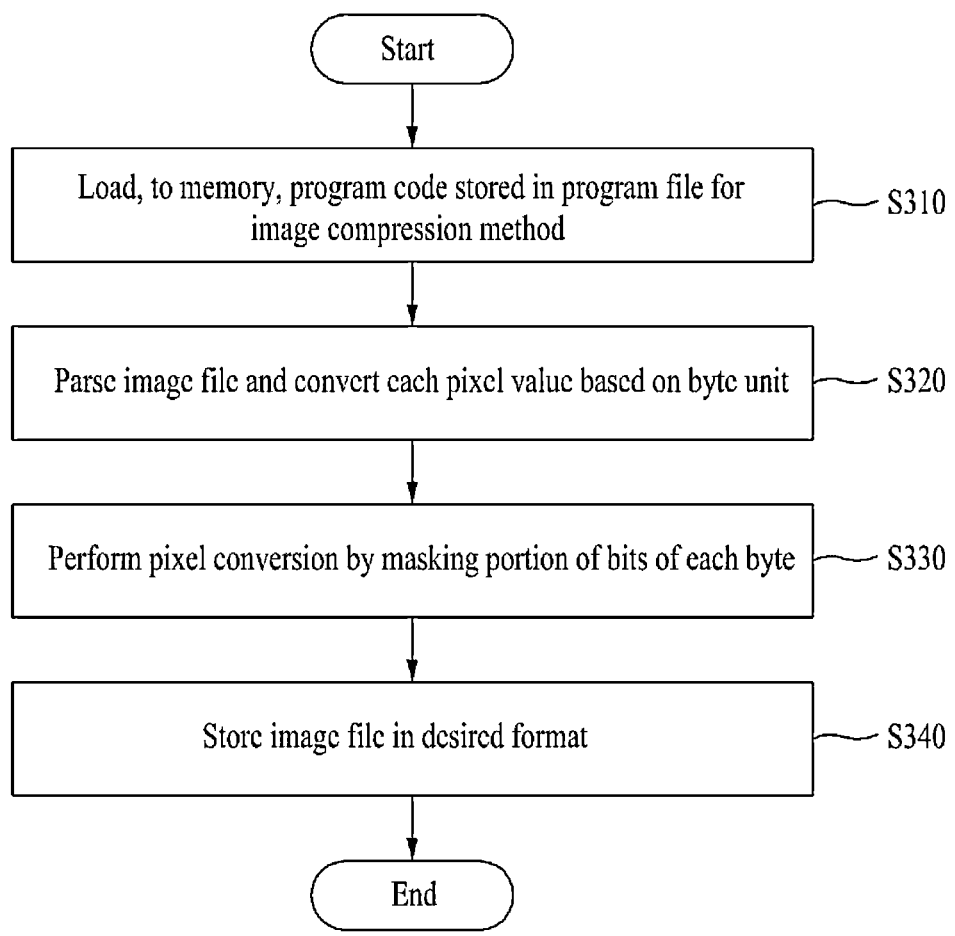
FIG. 3 is a flowchart illustrating an example of an image compression method performed by a computer system according to at least some example embodiments.
Figure 5:
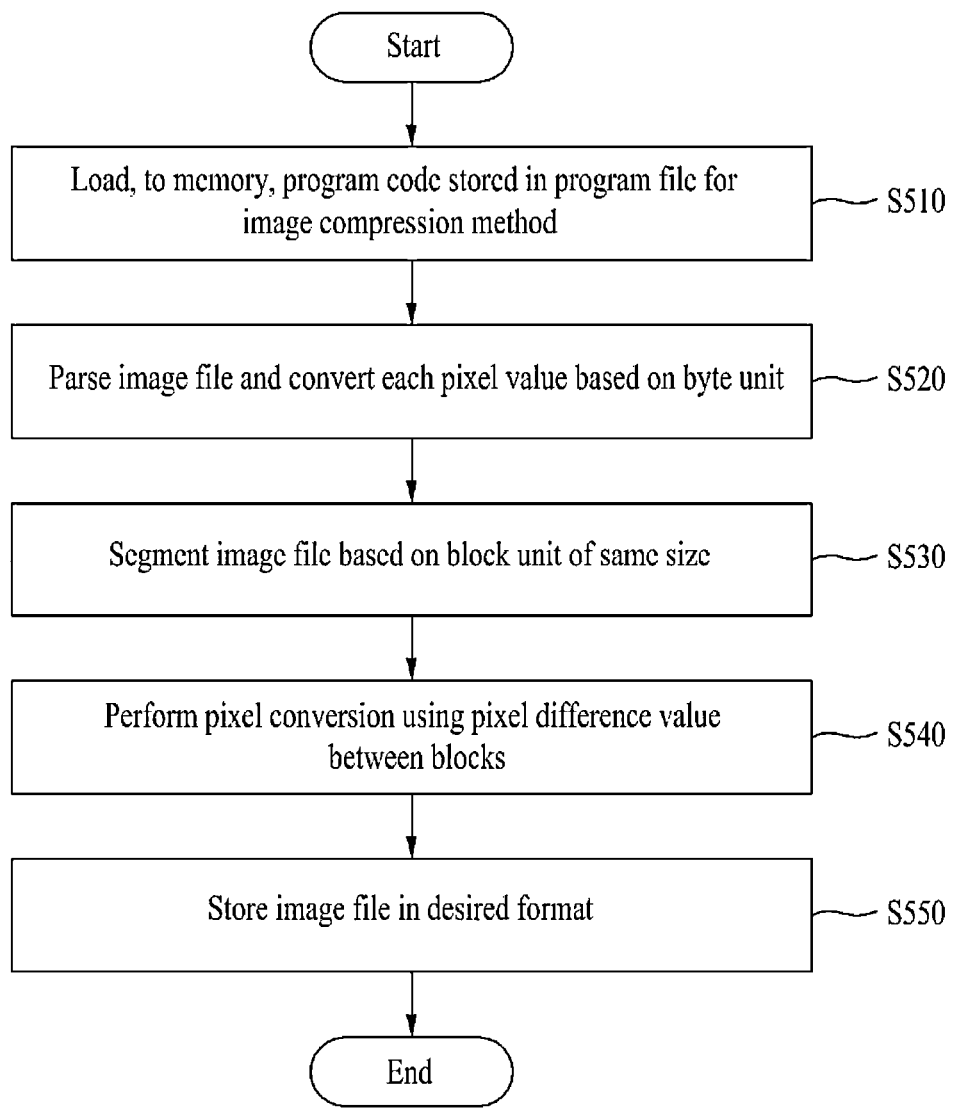
FIG. 5 is a flowchart illustrating another example of an image compression method performed by a computer system according to at least some example embodiments.

The image compression method of FIGS. 3 and 5 may not be performed in the illustrated sequence. A portion of operations may be omitted, or an additional process may be further included in the image compression method.

FIG. 3 is a flowchart illustrating an example of an image compression method performed by a computer system according to at least some example embodiments.

The example embodiment may improve an image compression ratio through a pixel conversion using a method of masking a portion of bits of each pixel included in an image file.

Referring to FIG. 3, in operation S310, the processor 110 may load, to the memory 120, a program code stored in a program file for the image compression method. For example, the program file for the image compression method may be stored in the permanent storage device 130 of FIG. 1. The processor 110 may control the computer system 100 to load the program code from the program file stored in the permanent storage device 130 to the memory 120 through the bus 140. Here, the processor 110 and the pixel masker 211 and the image storage 220 included in the processor 110 may be different functional representations of the processor 110 to perform the following operations S320 to S340 by executing an instruction of a portion corresponding to the program code loaded to the memory 120. To perform operations S320 to S340, the processor 110 and the components of the processor 110 may directly process an operation or may control the computer system 100 in response to a control instruction.

In operation S320, the pixel masker 211 may parse the image file, for example, a PNG file, to be compressed and may convert each pixel value based on a byte unit. That is, the pixel masker 211 may parse each pixel of the image file, may read the pixels one by one, and may convert each pixel value of the image file based on a byte unit.

In operation S330, the pixel masker 211 may perform a pixel conversion by masking a portion of bits of a byte representing a corresponding pixel value for each pixel of the image file. The pixel masker 211 may generate an image filter of ignoring a portion of bits and may reduce a data size of the image file through the image filter. For example, the pixel masker 211 may collect a preset number of bits, for example, n bits, based on a least significant bit (or least significant bits) of a byte representing each corresponding pixel value and may mask all of the collected bits to zeros. Here, the number of bits, for example, n bits, to be masked may be determined through experiments to be capable of preventing an image degradation and guaranteeing a desired quality level of an image. For example, 1 bit or 2 bits may be applied.

If an image file to be compressed is in a red, green, blue (RGB) format, a pixel conversion may be performed with respect to each of an R value, a G value, and a B value. It is provided as an example only. Without being limited to the RGB format, an image file in various formats, for example, an ARGB format including an alpha value, may be applied.

Figure 4:
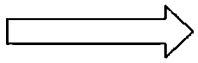
FIG. 4 illustrates an example of a process of converting each pixel value of an image file according to at least some example embodiments.

FIG. 4 illustrates an example of a process of converting RGB values of each pixel according to at least some example embodiments.

Each of an R value, a G value, and a B value of each pixel is represented as 1 byte.

Referring to FIG. 4, if an R value '30' of a pixel is to be converted, the R value '30' is converted to a binary number. Here, '30' may be represented as '00011110' using a binary number. Here, if the value '10' corresponding to the two least significant bits is ignored from '00011110', '00011110' becomes '00011100' and '00011100' is converted again to '28' using a decimal number.

The aforementioned pixel conversion process may be performed with respect to the entire pixels of the image file.

Referring again to FIG. 3, in operation S340, once the pixel conversion of the image file is completed, the image storage 220 may store the image file in a predetermined (or, alternatively, desired) format. Here, the image storage 220 may store the image file as a PNG file.

Herein, a data size may be reduced by adjusting a pixel value using a method of ignoring a portion of bits with respect to each pixel of the image file and by storing the image file as a PNG file. Although the same compression method defined in the PNG file is used, a number of common bits, that is, a number of the same values increases compared to that of a pixel of an original file through a pixel conversion, which may lead to improving an image compression ratio.

FIG. 5 is a flowchart illustrating another example of an image compression method performed by a computer system according to at least some example embodiments.

The example embodiment may improve an image compression ratio through a pixel conversion using a pixel difference value between blocks of an image file.

Referring to FIG. 5, in operation S510, the processor 110 may load, to the memory 120, a program code stored in a program file for the image compression method. For example, the program file for the image compression method may be stored in the permanent storage device 130 of FIG. 1. The processor 110 may control the computer system 100 to load the program code from the program file stored in the permanent storage device 130 to the memory 120 through the bus 140. Here, the processor 110 and the pixel difference value calculator 212 and the image storage 220 included in the processor 110 may be different functional representations of the processor 110 to perform the following operations S520 to S550 by executing an instruction of a portion corresponding to the program code loaded to the memory 120. To perform operations S520 to S550, the processor 110 and the components of the processor 110 may directly process an operation or control the computer system 100 in response to a control instruction.

In operation S520, the pixel difference value calculator 212 may parse the image file, for example, a PNG file, to be compressed and may convert each pixel value based on a byte unit. That is, the pixel difference value calculator 212 may parse each pixel of the image file, may read pixels one by one, and may convert each pixel based on a byte unit.

In operation S530, the pixel difference value calculator 212 may segment the image file into a plurality of blocks. Here, the pixel difference value calculator 212 may group pixels of the image file based on a block unit of the same size and may segment the image file into the plurality of blocks.

Figure 6:
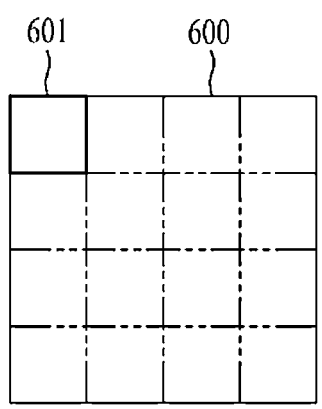
FIG. 6 illustrates an example of a process of segmenting an image file based on a block unit according to at least some example embodiments.

For example, referring to FIG. 6, a block unit 601 may be defined with an M×L pixel size. Here, M and L are each positive integers and M=L or M≠L. Also, an image file 600 may be segmented into a plurality of blocks 601 each having M×L pixels.

Referring again to FIG. 5, in operation S540, the pixel difference value calculator 212 may perform a pixel conversion with respect to the image file using a pixel difference value between blocks. The pixel difference value calculator 212 may adjust a pixel value by calculating a pixel difference value between a pixel value of a single block and a pixel value of a pixel present at a corresponding position of another block and by replacing the corresponding pixel value with the calculated pixel difference value.

FIG. 7 illustrates an example of a process of converting each pixel value according to at least some example embodiments.

Referring to FIG. 7, it is assumed that a single block includes 2×2 pixels and block (1) is a reference block.

For example, the pixel difference value calculator 212 may calculate difference value between a pixel value of a target block and a pixel value of a pixel present at a corresponding position of a neighboring block and may replace the pixel value of the target block with the calculated difference value.

According to at least some example embodiments, original pixel values are used as pixel values for pixels of the reference block, block (1), and for remaining blocks other than the reference block, the original pixel values may be replaced by the difference values corresponding to differences between values of corresponding pixels in neighboring blocks. For example, the processor 110 may calculate difference values by calculating differences between pixel values of block (2) and pixel values of block (1), and the processor 110 may use the calculated difference values as pixel values of the block (2). Likewise, the processor 110 may calculate difference values by calculating differences between pixel values of block (3) and pixel values of block (2), and the processor 110 may use the calculated difference values as pixel values of the block (3).

Thus, according to at least some example embodiments, the pixel conversion performed in operation S540 may include calculating differences (i.e., pixel difference values) between pixel values of pixels of a first block (e.g., block (1) in FIG. 7) and corresponding pixel values of pixels of a second block (e.g., block (2) or block (3) in FIG. 7); and replacing the pixel values of the second block with the calculated differences (i.e., the pixel difference values). Further, according to example embodiments, the first block may be a reference block (e.g., block (1) in FIG. 7), and the second block may be neighboring block (e.g., block (2) in FIG. 7) of the reference block, or another block (e.g., a block other than block (1) or block (2) in FIG. 7) from among the plurality of blocks.

Figure 8:
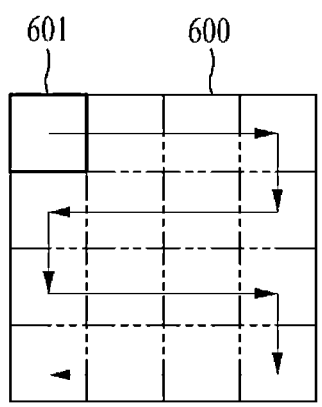

Pixel values of each block may be sequentially replaced with corresponding pixel difference values calculated with respect to corresponding pixel values of a neighboring block in a direction illustrated in FIG. 8, starting from the reference block 601.

The aforementioned method is provided as an example only. Therefore, a method of designating a reference block, a method of calculating pixel difference values, and the like, may be modified at any time.

For example, a method of calculating a pixel difference values with a reference block with respect to all of the blocks may be used instead of calculating pixel difference values with respect to neighboring blocks. For example, pixel difference values for some or all blocks could be calculated with respect to the same reference block (e.g., block (1) of FIG. 7). Also, any type of methods of calculating pixel difference values between blocks may be applied, such as, for example, a method of designating a center block as a reference block and calculating pixel difference values with the reference block or a neighboring block simultaneously in both directions of the reference block, a method of designating a first block for each row or each column as a reference block and calculating pixel difference values with a reference block of a corresponding row or column or a neighboring block simultaneously in a plurality of directions, and the like.

Referring again to FIG. 5, in operation S550, once the pixel conversion of the image file is completed, the image storage 220 may store the image file in a predetermined (or, alternatively, desired) format. Here, for example, the image storage 220 may store the image file through a data compression using a Huffman coding.

Herein, a data size of the image file may be reduced by adjusting a pixel value using a method of replacing each pixel value of the image file with a corresponding pixel difference value between blocks. In the case of storing a pixel difference value, the image file may be represented using a less number of bits, for example, 3 bits or 4 bits, compared to an actual pixel value. Although the same compression method defined in a PNG file is employed, not an absolute value but a difference value may be used through a pixel conversion. In this case, a frequency of a specific value increases and accordingly, a number of common bits, that is, a number of the same values increase, which may lead to improving an image compression ratio.

Figure 9:
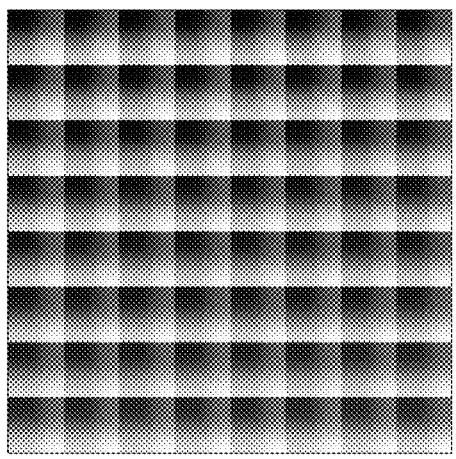
FIG. 9 illustrates an example of a lookup table (LUT) file according to at least some example embodiments.

FIG. 9 illustrates an example of a lookup table (LUT) file according to at least some example embodiments.

For example, an LUT file 900 may include 64 blocks each with a size of 64×64. Here, there is no big difference between the blocks.

In the case of storing a difference value between blocks, the difference value may be represented using a less number of bits. In the case of using not an absolute value but a difference value, a frequency of a specific value increases, which may lead to improving an image compression ratio.

For example, an image size may be predicted by generating a codebook and an encoding result as a file using Python.

In the case of storing the image file, the image storage 220 may separately generate a code of each of RGB (e.g., each of a red (R) color channel, a green (G) color channel, and a blue (B) color channel) for each block and may store a result (e.g., store the R, G and B codes generated for each block). As another example, the image storage 220 may separately generate a code of each of RGB with respect to the entire blocks and may store a result (e.g., store the R, G and B codes generated for all blocks of the entire image file). As another example, in the case of storing the image file, the image storage 220 may generate a code of the entire RGB at a time for each block and may store a result (e.g., a code, for each block, that corresponds to all of the red (R), green (G), and a blue (B) color channels), or may generate a code of the entire RGB at a time with respect to the entire blocks and may store a result (e.g., a code that corresponds to all of the red (R), green (G), and a blue (B) color channels for all blocks of the entire image file).

According to at least some example embodiments, the processor 110 may perform operations including grouping and processing a file generated based on a pixel difference value between the plurality of blocks according to a preset or, alternatively, desired compression method in the case of storing the image file of which the pixel conversion is completed. For example, the image storage 220 may compress and store the image file through a predetermined (or, alternatively, desired) compression method (tar, zip). Here, the image storage 220 may generate a codebook and an encoding result as a binary file through Huffman coding with respect to the image file. If a code is generated for each block or for each RGB, a number of files generated using a pixel difference value between blocks may significantly increase. Therefore, files may be group-processed using tar (including header information).

To improve an image compression ratio using Huffman coding, a rarely appearing value needs to be reduced. That is, a rarely appearing value a may be changed with a frequently appearing value a'. For example, a pixel value may be converted by masking the last one or two bits of each pixel to zeros or by using not an absolute value but a difference value.

Figure 10:
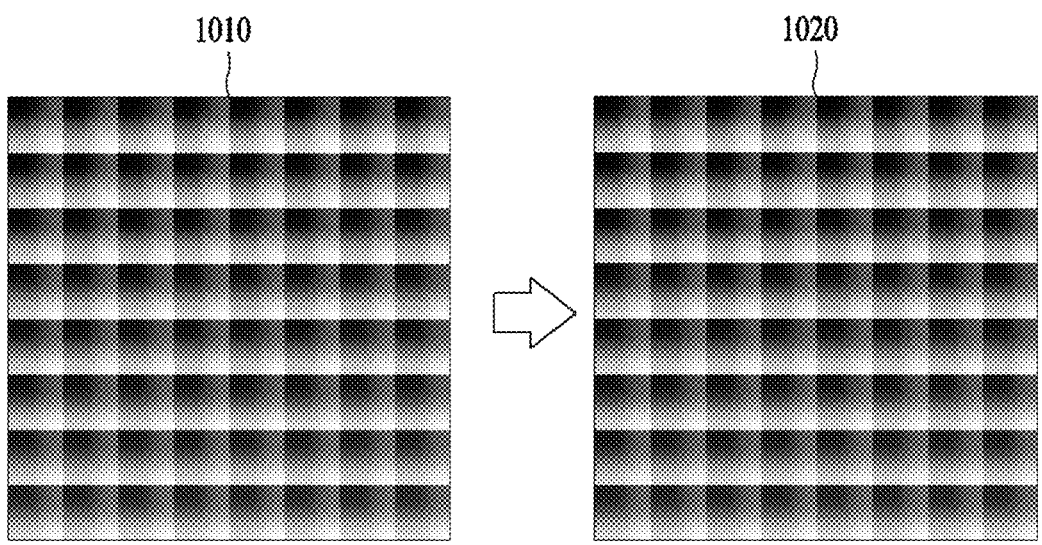
FIG. 10 illustrates an example of comparing an original image file and an image file of which a pixel conversion is completed according to at least some example embodiments.

Referring to FIG. 10, an image compression ratio of a pixel conversion file 1020 in which last one or two bits are ignored is predicted to be improved compared to that of an original file 1010. However, with bare eyes, there is no difference between the original file 1010 and the pixel conversion file 1020.

The pixel converter 210 may use a combination of a method of masking a portion of bits of each pixel and a method of replacing a pixel value with a corresponding pixel difference value between blocks. Here, in the case of storing the image file, the image storage 220 may generate a code of RGB at a time by ignoring the last one or two bits with respect to the entire blocks and may store a result.

As another example, the image storage 220 may reduce a data size by storing, as a PNG file, an image file of which a pixel conversion is completed without going through Huffman coding. That is, the image storage 220 may store RGB in which the last one or two bits are ignored as PNG without going through Huffman coding.

According to at least one example embodiments, it is possible to improve an image compression ratio by compressing an image file through a pixel conversion of masking a portion of bits of each pixel of the image file. Also, According to at least one example embodiments, it is possible to improve an image compression ratio by compressing an image file through a pixel conversion using a pixel difference value between blocks of the image block. Also, According to at least one example embodiments, it is possible to effectively increase a number of common bits for a pixel value to improve an image compression ratio by adjusting a pixel value using a combination of a method of masking a portion of bits of each pixel and a method of replacing a pixel value with a corresponding pixel difference value between blocks.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. An image compression method comprising:
   segmenting, by a processor, an image file to be compressed into a plurality of blocks;
   performing, by the processor, one of
   a first pixel conversion including determining first pixel difference values between blocks from among the plurality of blocks to obtain a plurality of bits representing the first pixel difference values, and first masking at least one bit among the plurality of bits to obtain first converted image data, or
   a second pixel conversion including second masking a portion of bits of a byte representing each pixel value of the image file to obtain masked pixel values, and determining second pixel difference values between the masked pixel values corresponding to the blocks from among the plurality of blocks to obtain second converted image data; and storing a converted image file in a first format, the converted image file including the first converted image data or the second converted image data, the storing including generating a code corresponding to at least one of red, green or blue color channels for the plurality of blocks of the converted image file, and compressing the converted image file according to a preset compression method based on the code.

2. The image compression method of claim 1, wherein the segmenting comprises:

grouping pixels of the image file based on a block unit of a same size and segmenting the image file into the plurality of blocks.

3. The image compression method of claim 1, wherein the determining first pixel difference values includes calculating differences between pixel values of pixels of a first block and corresponding pixel values of pixels of a second block to obtain first calculated differences, the first block and the second block being included among the plurality of blocks, and replacing the pixel values of the second block with the first calculated differences; and the determining second pixel difference values includes calculating differences between masked pixel values of the pixels of the first block and corresponding masked pixel values of the pixels of the second block to obtain second calculated differences, and replacing the masked pixel values of the second block with the second calculated differences.

4. The image compression method of claim 3, wherein the first block is a reference block from among the plurality of blocks, and the second block is a neighboring block of the reference block or another block from among the plurality of blocks.

5. The image compression method of claim 1, wherein the first masking includes masking a first number of bits among the plurality of bits to zeros based on one or more least significant bits; and the second masking includes masking the first number of bits to zeros based on one or more least significant bits of the byte representing each pixel value.

6. The image compression method of claim 1, wherein the generating separately generates a respective code of each of the red, green and blue color channels for each block among the plurality of blocks of the converted image file.

7. The image compression method of claim 1, wherein the generating separately generates a respective code of each of the red, green and blue color channels with respect to all of the plurality of blocks of the converted image file.

8. The image compression method of claim 1, wherein the generating generates a respective code of all of the red, green and blue color channels for each block among the plurality of blocks of the converted image file.

9. A non-transitory computer-readable recording medium storing instructions that, when executed by a processor, cause the processor to perform operations including, segmenting, by a processor, an image file to be compressed into a plurality of blocks, performing, by the processor, one of a first pixel conversion including determining first pixel difference values between blocks from among the plurality of blocks to obtain a plurality of bits representing the first pixel difference values, and first masking at least one bit among the plurality of bits to obtain first converted image data, or a second pixel conversion including second masking a portion of bits of a byte representing each pixel value of the image file to obtain masked pixel values, and determining second pixel difference values between the masked pixel values corresponding to the blocks from among the plurality of blocks to obtain second converted image data, and storing a converted image file in a first format, the converted image file including the first converted image data or the second converted image data, the storing including generating a code of all of red, green, and blue (RGB) color channels for each block among the plurality of blocks of the converted image file to obtain a plurality of codes, and compressing the converted image file according to a preset compression method based on the plurality of codes.

10. The non-transitory computer-readable recording medium of claim 8, wherein the segmenting comprises:

grouping pixels of the image file based on a block unit of a same size and segmenting the image file into the plurality of blocks.

11. The non-transitory computer-readable recording medium of claim 8, wherein the determining first pixel difference values includes calculating differences between pixel values of pixels of a first block and corresponding pixel values of pixels of a second block to obtain first calculated differences, the first block and the second block being included among the plurality of blocks, and replacing the pixel values of the second block with the first calculated differences; and the determining second pixel difference values includes calculating differences between masked pixel values of the pixels of the first block and corresponding masked pixel values of the pixels of the second block to obtain second calculated differences, and replacing the masked pixel values of the second block with the second calculated differences.

12. The non-transitory computer-readable recording medium of claim 11, wherein the first block is a reference block from among the plurality of blocks, and the second block is a neighboring block of the reference block or another block from among the plurality of blocks.

13. The non-transitory computer-readable recording medium of claim 11, wherein the first masking includes masking a first number of bits among the plurality of bits to zeros based on one or more least significant bits; and the second masking includes masking the first number of bits to zeros based on one or more least significant bits of the byte representing each pixel value.

14. A computer system comprising:

memory storing computer-executable instructions; and one or more processors configured to execute the computer-executable instructions such that the one or more processors are configured to, segment an image file to be compressed into a plurality of blocks, perform one of a first pixel conversion including determining first pixel difference values between blocks from among the plurality of blocks to obtain a plurality of bits representing the first pixel difference values, and first masking at least one bit among the plurality of bits to obtain first converted image data, or a second pixel conversion including second masking a portion of bits of a byte representing each pixel value of the image file to obtain masked pixel values, and determining second pixel difference values between the masked pixel values corresponding to the blocks from among the plurality of blocks to obtain second converted image data, and store a converted image file in a first format, the converted image file including the first converted image data or the second converted image data, the storing including generating a code corresponding to at least one of red, green or blue color channels for the plurality of blocks of the converted image file, and compressing the converted image file according to a preset compression method based on the at least one code.

15. The computer system of claim 14, wherein the one or more processors are configured to execute the computer-executable instructions such that the one or more processors are further configured to group pixels of the image file based on a block unit of a same size and to segment the image file into the plurality of blocks.

16. The computer system of claim 14, wherein the determining first pixel difference values includes calculating differences between pixel values of pixels of a first block and corresponding pixel values of pixels of a second block to obtain first calculated differences, the first block and the second block being included among the plurality of blocks, and replacing the pixel values of the second block with the first calculated differences; and the determining second pixel difference values includes calculating differences between masked pixel values of the pixels of the first block and corresponding masked pixel values of the pixels of the second block to obtain second calculated differences, and replacing the masked pixel values of the second block with the second calculated differences.

17. The computer system of claim 16, wherein the one or more processors are configured to execute the computer-executable instructions such that the one or more processors are further configured such that the first block is a reference block from among the plurality of blocks, and the second block is neighboring block of the reference block or another block from among the plurality of blocks.

18. The computer system of claim 14, wherein the first masking includes masking a first number of bits among the plurality of bits to zeros; and the second masking includes masking the first number of bits of the byte representing each pixel value to zeros.

19. The computer system of claim 18, wherein the first number of bits among the plurality of bits is based on one or more least significant bits; and the first number of bits of the byte representing each pixel value is based one or more least significant bits of the byte representing each pixel value.

20. The computer system of claim 14, wherein the generating comprises:

separately generating a respective first code of each of the red, green and blue color channels for each block among the plurality of blocks of the converted image file, separately generating a respective second code of each of the red, green and blue color channels with respect to all of the plurality of blocks of the converted image file, or generating a respective third code of all of the red, green and blue color channels for each block among the plurality of blocks of the converted image file.

* * * * *